United States Patent [19]
Clayton, Sr. et al.

[11] 3,877,299
[45] Apr. 15, 1975

[54] BRAKE PEDAL ACTUATOR
[75] Inventors: William Clayton, Sr.; Edwin Lee Cline, both of Pasadena, Calif.
[73] Assignee: Clayton Manufacturing Company, El Monte, Calif.
[22] Filed: July 25, 1973
[21] Appl. No.: 382,385

[52] U.S. Cl. .................................... 73/132; 73/117
[51] Int. Cl. ............................................... G01l 5/28
[58] Field of Search ............. 73/132, 121, 123, 126, 73/117

[56] References Cited
UNITED STATES PATENTS

| | | | |
|---|---|---|---|
| 3,465,577 | 9/1969 | Donovan | 73/117 UX |
| 3,516,287 | 6/1970 | Masada et al. | 73/117 |
| 3,662,593 | 5/1972 | Pirrello | 73/132 |
| 3,712,126 | 1/1973 | Campbell | 73/117 |
| 3,713,332 | 1/1973 | Herrbrich | 73/117 |

*Primary Examiner*—Jerry W. Myracle

[57] ABSTRACT

A removable brake pedal actuator for applying a force to conventional vehicle brake pedals in accordance with a control signal for brake testing purposes is described. The actuator includes a frame which rests on the vehicle floor board and is held in place by an operator's foot. A contact pad is provided for engagement with the brake pedal. A force transferring or coupling mechanism in the form of a pneumatically operated piston cylinder assembly is connected between the frame and pedal contact pad to provide a pedal force in response to the control signal.

A contact sensor is mounted on the contact pad to provide an indication that the contact pad is in actual contact with the brake pedal. A pressure sensor is also carried by the contact pad for engagement with the brake pedal to provide a signal representative of the force applied to the brake pedal. A floor clearance probe or transducer is also provided on the actuator for providing an indication that the distance between the brake pedal and vehicle floor has decreased below a minimum acceptable value. The piston can be connected to a position indicating transducer such as a potentiometer for permitting the travel of the brake pedal to be ascertained during braking tests. The actuator may be a part of a servo control loop in which feedback signals representative of a desired braking effort or brake pedal pressure are used to control the actuator.

32 Claims, 11 Drawing Figures

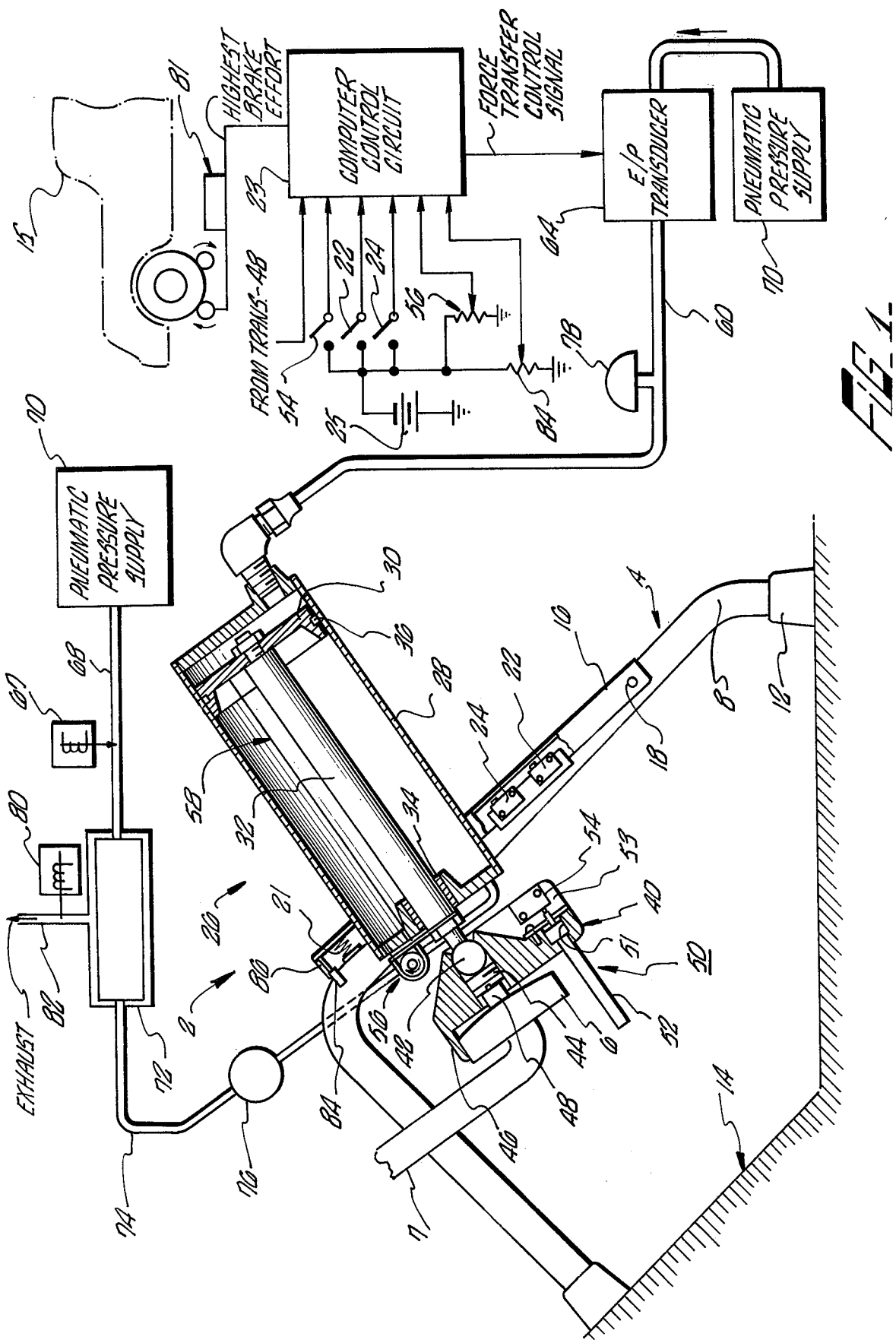

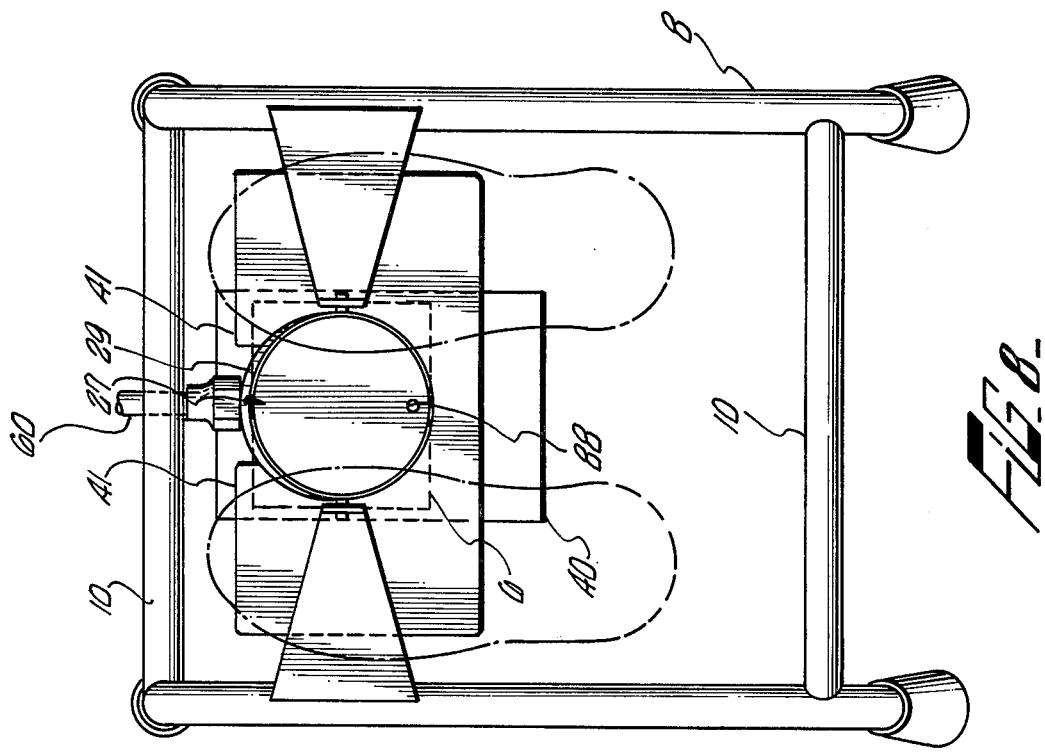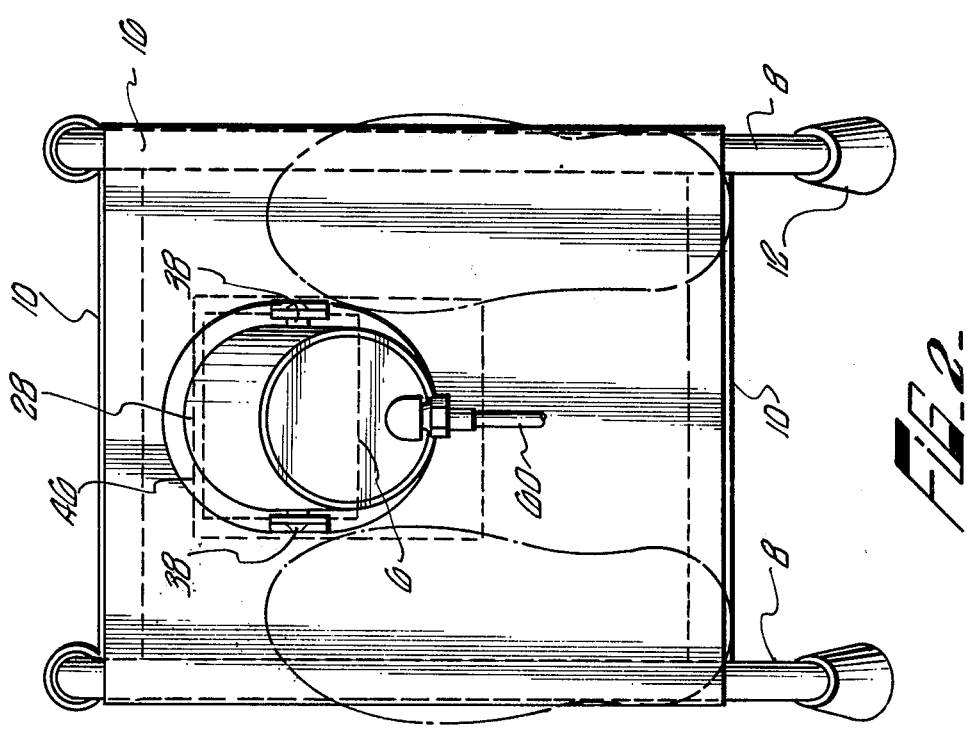

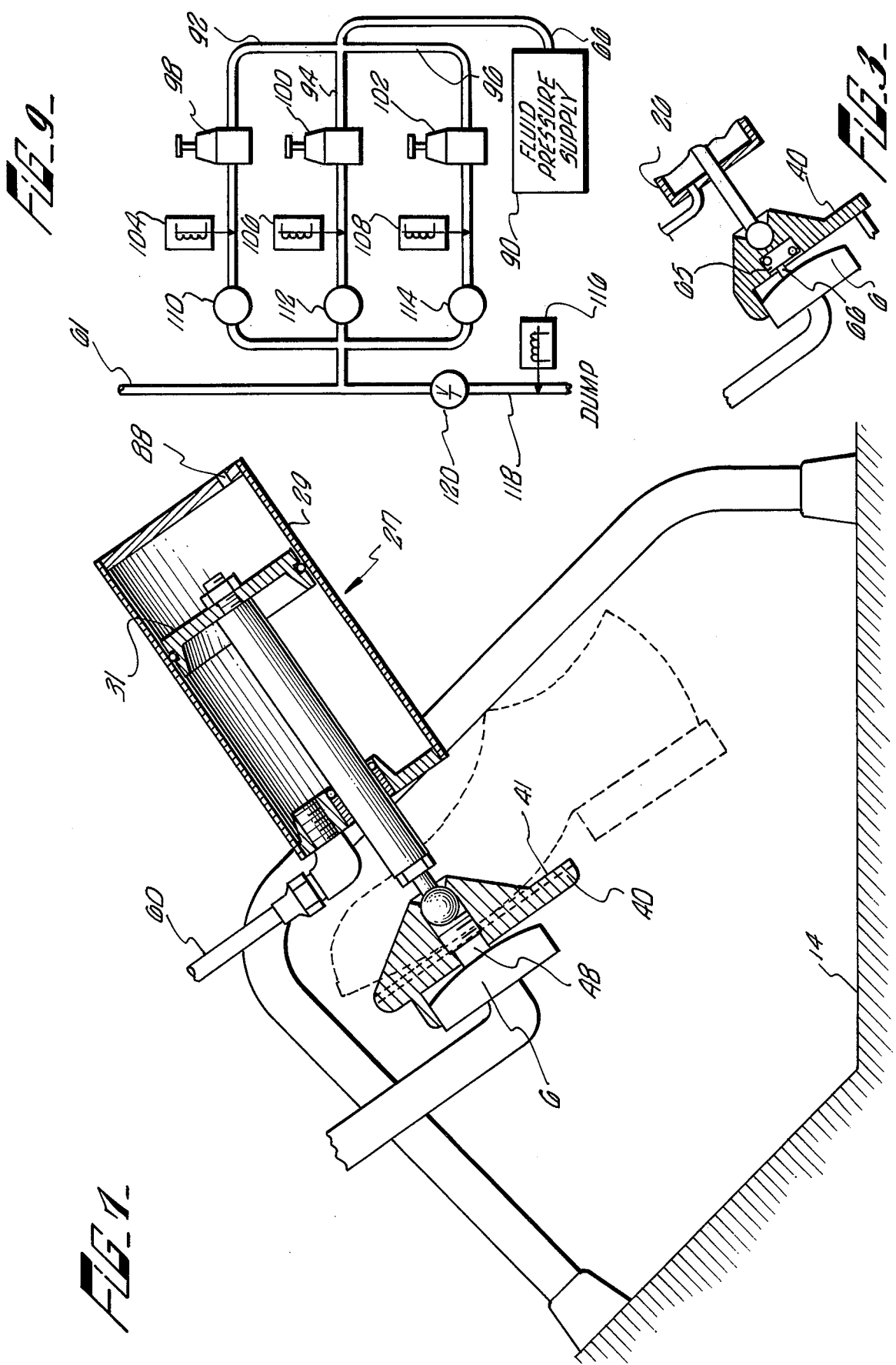

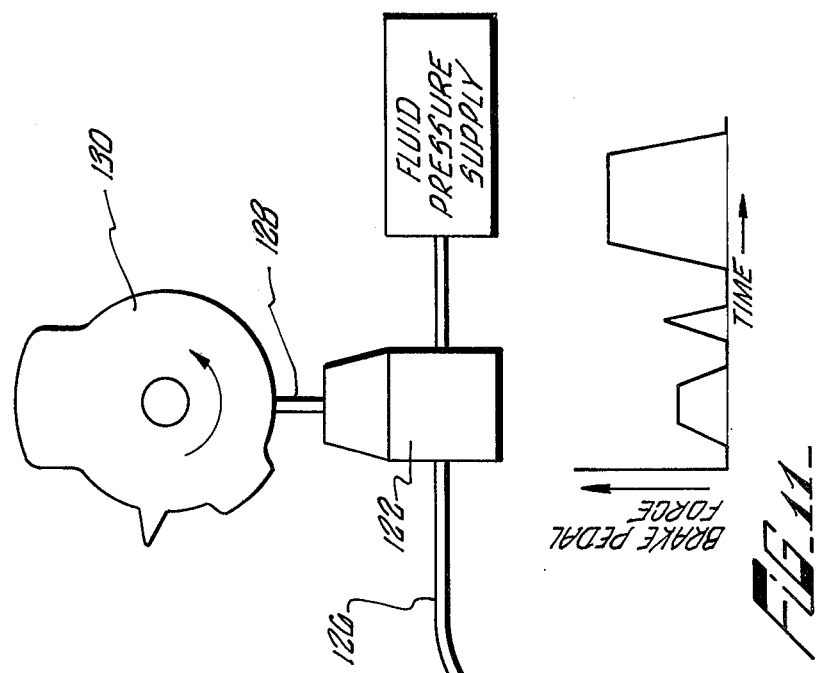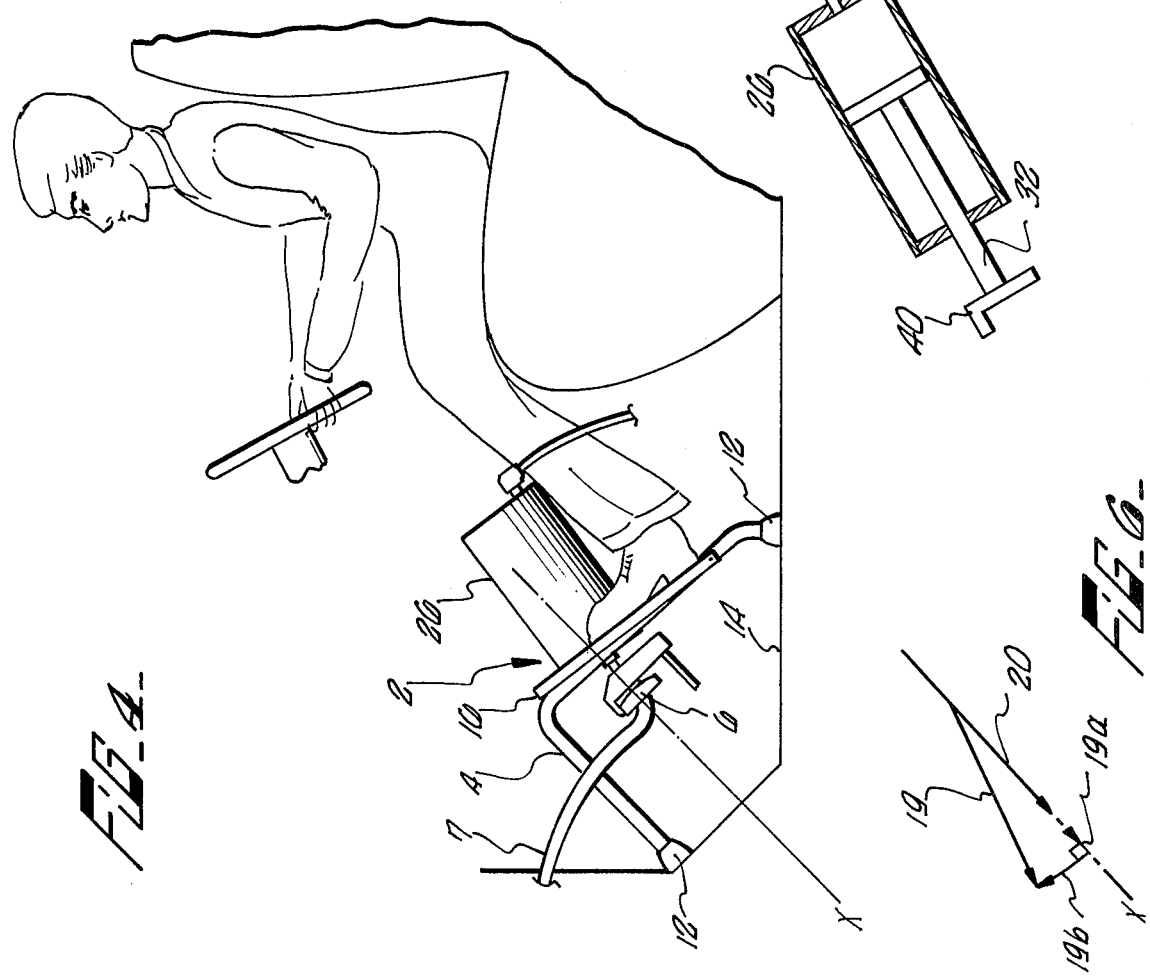

BRAKE PEDAL ACTUATOR

BACKGROUND OF THE INVENTION

1. Field of the Invention

The present invention is directed generally to apparatus for applying a predetermined force to a lever such as an automobile brake pedal and more particularly to a removable brake pedal actuator that is adaptable to accurate and rapid testing procedures such as required in assembly line testing of vehicles.

2. Description of the Prior Art

The emphasis on vehicle safety has created an increased demand for a rapid mass vehicle brake testing system, such as state periodic in-service vehicle inspection or assembly line inspection of new vehicles. Dynamic brake analyzers of the motoring dynamometer type are capable of obtaining accurate test data concerning the performance of a vehicle's brakes under simulated road conditions while an operator manually actuates the brake pedal. Since the pedal force used for any particular test is dependent upon a human operator, the test data, e.g. braking effort, obtained from the test cannot be readily correlated with the data obtained from other tests. Experience has indicated that it is difficult for a human operator to consistently provide even approximate brake effort levels or brake pedal forces because of the time required for a human operator to respond to changes in the observed test parameters, and the inability to properly make small corrections and the tendency to overcorrect.

To meet the need for consistent and reproducible test results, it is necessary to operate the vehicle's brake pedal in a rapid and predictable manner to provide predetermined brake effort levels (retarding force between vehicle wheels and the dynamometer drive rollers) or predetermined pedal forces. A brake pedal actuator system for use in a rapid mass vehicle testing system must also be capable of actuating the vehicle's brake pedal upon command from a computer or automatic control system. In addition, the actuator must also feed back useful data to the computer relative to the pedal force being applied, pedal travel, distance from the floor board, etc.. Since it is highly desirable to provide a rapid testing of a large number of vehicles, the particular brake pedal actuator must be capable of easy and rapid installation into and from the individual vehicles.

The styling trends of the interior of vehicles has produced a complex and varying range of dimensions. It has been found to be extremely difficult to design an actuator that can be easily held in place by attaching braces or fastening members to the vehicle's interior. For this reason, brake pedal actuators such as in the U.S. Pat. No. 1,898,376 (1933) and U.S. Pat. No. 2,018,451 (1935) would be incapable of accommodating themselves to the interior of modern vehicles, let alone facilitating a rapid inspection procedure with a computerized system.

Likewise, passive brake pedal transducers such as disclosed in U.S. Pat. No. 3,613,440 (1971) and U.S. Pat. No. 1,684,639 (1928) are neither readily adaptable to a quick removal nor are they capable of exerting precise and reproduceable brake pedal forces. Further, these passive units are incapable of providing the wide range of data required for a computerized system.

Various forms of dynamometers and brake testers are known in the prior art, such as U.S. Pat. No. 3,277,703 (1966) and U.S. Pat. No. 3,504,537 (1970) and are cited as illustrative of the environment of the present invention.

SUMMARY OF THE INVENTION

In accordance with the present invention, an actuator mechanism is provided for controlling the operation of a lever such as a vehicle brake pedal mounted adjacent a reference surface such as a floor board. The lever is responsive to the application of a range of external forces, e.g. 3 to 50 pounds in a first direction which intersects the reference surface. The actuator mechanism includes a frame member which is adapted to be removably positioned on the reference surface adjacent the lever.

A lever contact member is provided for engaging the lever or brake pedal. Force receiving means such as a foot treadle or plate is carried either by the frame or the lever contact member for receiving a manually applied reference force having a component in the first direction. Force transferring means, such as a fluid power cylinder is connected between the frame and lever contact members for transferring or coupling a selected portion of the component of the reference force in the first direction from the member carrying the force receiving means to the other member to thereby control the force applied to the lever.

The actuator may include a force sensor for providing an output signal representative of the force exerted on the lever. When the actuator is used to control a vehicle brake pedal, a signal representative of the vehicl braking effort or pedal force may be used to control the amount of force transferred between the contact and frame members to provide a predetermined braking effort or pedal force.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a side view, partially in section, of an actuator mechanism and a schematic diagram of a control system therefor in accordance with the present invention;

FIG. 2 is a plan view of FIG. 1;

FIG. 3 is a side view of a portion of the brake actuator of FIG. 1;

FIG. 4 is a side view of the actuator of FIG. 1 as positioned in a vehicle;

FIG. 5 is a schematic diagram of the control circuit for one of the solenoid valves illustrated in FIG. 1;

FIG. 6 is a vector diagram illustrating the separate components of typical force applied by an operator to the actuator of FIG. 1;

FIG. 7 is a side view, partially in section, of an alternative embodiment of an actuator in accordance with the present invention;

FIG. 8 is a plan view of FIG. 7;

FIG. 9 is a schematic diagram of a simple type of control system for use with the actuator of FIG. 1;

FIG. 10 is a schematic diagram of another control system for use with the actuator of FIG. 1; and FIG. 11 is a chart showing the brake pedal force supplied by the control system of FIG. 10 with respect to time.

DESCRIPTION OF THE PREFERRED EMBODIMENT

Referring now to the preferred embodiment shown in FIGS. 1 through 4, and in particular FIG. 1, of the drawings, a brake pedal actuator 2 includes a bridge support or frame member 4 adapted to be mounted over and about a brake pedal 6. The frame 4 comprises a pair of L-shaped tubular members 8 interconnected by lateral tubular support members 10 as shown in FIG. 2. Rubber pads 12 are provided on the L-shaped tubular members 8 to facilitate a non-slip contact with a reference surface on floor board 14 of a vehicle 15. See FIG. 1. The brake pedal 6 is carried by a conventional lever 7 which is mounted on the vehicle for movement about a pivot axis (not shown). Movement of the brake pedal in the X direction, as illustrated in FIG. 4, applies the brakes of the vehicle through a conventional hydraulic or pneumatic system (not shown).

Unlike conventional brake pedal actuators, the frame member 4 is held in place against the vehicle floor board by a manual reference force exerted by an operator's feet as shown in FIGS. 2 and 4. Since the actuator 2 does not require a permanent or semi-permanent attachment to the vehicle, it is possible to quickly insert or remove the actuator from a vehicle.

As shown in FIG. 2, the operator's feet are preferably positioned as disclosed in the phantom lines on the top of a manual force receiving means in the form of a treadle 16. The treadle 16 is pivotably mounted at its lower end to the frame member by pivot shafts 18 as shown in FIG. 1. At least one or more springs 21 are connected between the upper end of the treadle 16, and the frame member 4 to bias the upper end of the treadle away from the frame. When a force is applied to the treadle 16 by the operator's feet, the spring 21 deflects or shortens in length proportionately to the applied force.

A pair of treadle sensor microswitches 22 and 24 are connected to the frame 4 beneath the treadle 16. The first microswitch 22 is used with power assisted brakes and the second microswitch 24 is used when the vehicle under test is equipped with manual or non-power assisted brakes. The power brake treadle sensor microswitch 22 will close when a first predetermined force, e.g. 30 pounds is applied to the treadle. The closure of switch 22 provides a high level signal to a computer control circuit 23 via battery 25 as is illustrated in FIG. 1. The high level signal from the switch 22 indicates that the force applied to the treadle is in excess of the maximum anticipated force to be applied to the brake pedal during a test of the performance of the vehicle brakes.

The second treadle sensor switch 24 is actuated by a greater deflection of the treadle in response to a second predetermined force, e.g. 50 pounds. Closure of switch 24 provides a high level signal to the computer control circuit indicating that the brake actuator is ready to test manual brakes.

The actuator 2 includes force transferring means 26 in the form of a pivotably mounted fluid power cylinder 26 having a hollow cylindrical body 28 and a piston 30. A piston rod 32 is connected to the piston 30 and is journaled in a low friction bearing 34 mounted on the lower end of the cylindrical body 28. The piston 30 carries an appropriate low friction bearing seal such as O-ring 36 for sealing with the interior surface of the cylindrical body 28. Fluid, e.g. air under pressure, is introduced into the cylindrical body 28 above the piston 30 to urge the piston toward the brake pedal with a predetermined force as will be described in more detail.

The fluid power cylinder 26 is pivotably mounted as can be seen in FIG. 2 by a pair of pivot shafts 38. As is best illustrated in FIG. 1, the pivotal mounting of the fluid power cylinder 26 permits the piston 30 to apply a force over a range of angles with respect to the frame for accommodating different brake pedal and floor arrangements in a wide variety of vehicles.

A brake pedal contact pad 40 is connected to the piston rod 32 via a universal ball joint 42. A threaded plug 44 can be utilized to hold the ball joint 42 in position against an annular shoulder as shown. A flange 46 extends from the upper edge of the contact pad 40 to facilitate the alignment and engagement of the contact pad 40 with the brake pedal 6.

The fluid power cylinder 26 is connected between the brake pedal contact pad 40 and the frame 4 and exerts equal and opposite forces on the contact pad and frame in a direction to urge these members apart. Any force applied to the contact pad and brake pedal by the fluid power cylinder must be balanced by an equal reactive force applied to the frame by the operator. Therefore, the operator must always apply a sufficient force to the treadle 16 to keep the frame 4 in contact with the vehicle floor board 14 during the braking tests. The fluid power cylinder 26 thus serves to couple or transfer a portion (0 to 100 percent) of the manually applied reference force from the frame to the contact pad and brake pedal. The reference force must not only be greater than the maximum anticipated pedal force, but it must have a component in the X direction which is greater than the anticipated pedal force since only the X direction component actuates the brake. It is this X direction component of the reference force which is transferred or coupled by the assembly 26 from the frame 4 to the control pad 40 and brake pedal to control the brakes.

A typical reference force as applied to the treadle 16 and frame 4 of the actuator is illustrated in FIG. 6 by the reference numeral 19. The maximum force to be applied to the brake pedal 6 during the braking performance test to be conducted on the vehicle 15 is identified as 20. The reference force 19 includes a component 19a in the X direction and an orthoganal component 19b.

Referring again to FIG. 1, a pedal force sensor or transducer 48 is mounted on the bottom of the contact pad 40. The force transducer 48 may be of the type which changes an electrical characteristic, such as resistance or voltage, when it is placed in compression, e.g. piezoelectric crystal. Numerous fource transducers are available in the prior art that can be used with the present invention to provide an appropriate electrical output signal which is proportional to the force applied to the brake pedal by the actuator.

The output signal from the force transducer 48 may be monitored by an automatic or computer controlled system 23 to provide a record of the actual force utilized to depress the pedal 6 during a brake test. The transducer signal may also be utilized to control the fluid power cylinder 26 as will be explained.

A floor clearance probe assembly 50 is also incorporated into the contact pad 40. This probe assembly 50 includes a plunger 52 and a microswitch 54. The plunger 52 can be fitted into a stepped bore 51 in the contact pad 40 so that it protrudes below the bottom of the contact pad 40. A closure member 53 holds the probe 50 in position and carries a microswitch 54 that is attached to the contact pad 40 in such a manner that its actuator just touches the upper end of the plunger 52. If the brake pedal 6 is depressed by the fluid power cylinder 26 to the point where the plunger 52 contacts the floor board 14, the plunger 52 will move upward in relationship to the contact pad 40 and trip or close the microswitch 54. This switch closure can be monitored by the automatic or computer control circuit 23 to indicate when minimum pedal to floor realtionship has been exceeded, which on a known type of vehicle is an indication of insufficient brake pedal reserve. The microswitch 54 can also operate a light to inform the operator of inadequate pedal reserve. Thus, the floor clearance probe assembly 50 monitors the brake pedal to floor relationship.

Referring to FIG. 1, a multi-turn potentiometer 56 is attached to the cylinder 28 with the movable center tap thereof connected to the piston 30 by a flexible line or cord 58. The center tap of the potentiometer 56 is biased by means of a suitable spring, not shown, to rotate in a direction to wind up the cord 58 and return the center tap to an initial starting position. The electrical resistance between the center tap and a fixed end of the potentiometer 56 is proportional to the position of the piston relative to the top or bottom of the cylinder 28. The change in resistance of the potentiometer may be converted into a d.c. voltage by connecting the potentiometer across a suitable source of current such as battery 25. Other forms of position indicating transducers may be utilized in place of the potentiometer 56. The use of the potentiometer 56 permits changes in brake pedal position during a particular test to be monitored. Brake pedal travel with constant pedal pressure may be indicative of a hydraulic leak in the vehicle's braking system.

Referring now to FIGS. 1 and 3, the system for controlling the piston-cylinder assenbly 26 is illustrated. Air or other suitable gas is supplied to an electro-pneumatic transducer 64 from a fluid pressure source 70. The transducer converts a direct current (d.c.) control signal from a computer control circuit 23 into a proportional pneumatic pressure in outlet line 60. Such transducers are well known in the prior art. One such transducer in manufactured by Conoflow Corporation as a Series T electro-pneumatic transducer which provides an outlet pressure of 3 to 15 pounds per square inch gauge (psig) in response to a 0 to 15 milliamperes (m.a.) control signal.

In the preferred embodiment, the transducer 64 is designed to provide a minimum outlet pressure of approximately 3 psig pressure on line 60. This minimum outlet pressure creates a force on the upper side of the piston 30 and causes it to move toward the lower end of the cylinder 28 until the piston rod 32 and contact pad 40 are in the fully extended position. A brake pedal engagement sensor in the form of a microswitch 65 is mounted on the side of the contact pad 40 as shown in FIG. 3 so that its actuating arm 66 protrudes just beyond the contact surface of the transducer 48.

To install the actuator 2 within a vehicle, the operator positions the frame 4 until the contact pad 40 is above the brake pedal. The frame 4 is then lowered until the contact pad 40 energizes the brake pedal 6. Referring now to FIG. 3, when the actuator arm 66 of the switch 65 on the contact pad touches the brake pedal 6, switch 65 closes and energizes a solenoid valve 67 in a pneumatic pressure line 68 which is connected to the source of pneumatic pressure 70. The pneumatic pressure line 68 exhausts into an accumulator 72 when the valve 67 is open. The accumulator 72 is connected via pressure supply line 74 to the bottom of the cylinder 28. An adjustable valve 76 is positioned between the accumulator 72 and the cylinder 28 to control the response rate of the system.

The introduction of air under pressure to the lower portion of the cylinder body 28 creates a force on the lower side of the piston 30. When the pressure of this air increases to the point that the force on the lower side of the piston 30 is equal to or greater than the force on the upper side of the piston 30, the piston 30 will cease its downward movement. As the pneumatic pressure on the lower side of the piston 30 increases, the piston 30 will move upward towards the upper end of the cylindrical body 28, thus retracting the piston rod 32 and the attached contact pad 40 until the frame 4 is seated on the vehicle floor board. When the contact pad 40 has retracted sufficiently to cause actuator arm 66 of the microswitch 65 to lose contact with the brake pedal 6, the switch contacts will open and de-energize the solenoid valve 67. This action traps the air which has previously flowed through valve 67 in the accumulator 72. The resultant force exerted on the brake pedal by the contact pad is slightly less than the force required to operate the microswitch so that actual contact is provided between the pad 40 and brake pedal without the application of sufficient force to operate the vehicle brakes.

The air trapped in the accumulator 72 acts as a pneumatic spring to return the piston 30 to its initial position after the brake pedal actuator 2 has depressed and subsequently released the brake pedal 6. To prevent the microswitch 65 from operating the solenoid valve 67 during an actual brake testing procedure, a pressure switch 78 is coupled in the actuator air line 60. The pressure switch 78 is normally closed and is adjusted to open at a pressure just above the minimum output pressure from the transducer 64, e.g. 3.1 psig. Thus, when the transducer 64 receives a signal from the computer 23 to increase its output pressure above the 3.1 psig minimum pressure level, the pressure switch 78 opens and disarms the solenoid valve 67 as is shown in FIG. 5.

As shown in FIG. 1, solenoid dump valve 80 is provided in an exhaust line 82 from the accumulator 72 to reduce the air pressure in the accumulator and line 74 to atmospheric pressure. A command signal to the dump valve 80 from the computer or automatic control system 23 automatically dumps or exhausts the pressure trapped in the accumulator 72 and permits the actuator to be readied for positioning in another vehicle.

The fluid power cylinder 26 may be included in an appropriate servo loop by means of the computer control circuit 23 to provide either a desired vehicle braking effort or a desired pedal force For example, a dynamic brake analyzer 81 is illustrated in FIG. 1 as providing output signals to the computer circuit 23 representative of the brake efforts of the wheel brakes under test.

The computer circuit sends a control signal to the electropneumatic transducer 64 in response to the highest brake effort signal (or the sum of the two brake effort signals) from the analyzer 81 to increase or decrease the outlet pressure in line 60 until the desired brake effort is achieved. The computer circuit 23 may insert the pedal force transducer 48 in the servo loop to achieve a desired pedal force in the same manner.

Test vehicles are regularly moved during the testing procedure from a front axle test position to a rear axle test position and it is highly desirable for the brake pedal actuator 2 to remain in an operative position in the vehicle during this movement. It is also necessary for safety purposes to permit the operator to be able to control the vehicle's brakes during this movement. In the embodiment of the present invention disclosed in FIG. 1, the brakes may be controlled directly by the operator during this time by feeding a control signal representative of the force applied to the treadle back to the electro-pneumatic transducer 64. To provide this type of feedback control signal a linear potentiometer 84 is mounted on the frame 4 with its movable center tap coupled to a spring biased operating rod 86 which contacts the underside of the treadle 16.

The force exerted on the treadle 16 by the operator deflects and shortens the spring 21 which in turn moves the potentiometer rod 86 and changes the resistance between the center tap and an end terminal of the potentiometer 84. This resistance change is converted to a voltage change by the battery 25. The voltage signal from the potentiometer 84 is fed to the computer control circuit which in turn sends a proportional signal to the transducer 64. The transducer 64 provides an output fluid pressure in the line 60 which is proportional to the signal from the potentiometer 84 and the treadle force. An increase in the force applied to the treadle 16 by the operator results in an increase in the pressure in line 60 and an increase in the force applied to the brake pedal and vice versa. This auxiliary feature permits the operator to have a proportional type of control of the vehicle's brakes during the time the vehicle is being moved.

Referring to FIGS. 7 and 8, an alternative embodiment of the present invention is provided wherein a force receiving means in the form of a foot plate 41 is carried by the pedal contact pad 40 instead of by the frame. It should be noted that the contact pad 40 illustrated in FIG. 7 is equipped with the same sensing elements as the pad 40 of FIG. 1, except that the contact sensing switch 65 is not utilized in FIG. 7. The frame 4 of FIGS. 1 and 7 is also the same with the exception of the treadle 16 which is not used in the embodiment of FIG. 7. In the embodiment of FIG. 7 the operator's foot is placed directly on top of the force receiving plate 41 to exert a downward force on the brake pedal 6.

A fluid power cylinder 27 functions to transfer or couple all or part of the reference force applied to the plate 41 by the operator to the frame 4 which in turn transmits the force to the reference surface or floor board 14 of the vehicle. The fluid power cylinder 27 of FIG. 7 also applies equal and opposite forces to the control pad 40 and the frame member 4, but the direction of the forces with respect to each member is reversed as compared to the embodiment of FIG. 1. The fluid power cylinder 27 is utilized to remove a selected portion (0 to 100 percent) of the force applied by the operator's feet from the brake pedal in accordance with the pneumatic control signal in line 60 or the electrical control signal from the computer circuit 23. The upper portion of the cylinder body 29 is vented to atmosphere with an orifice 88. With this arrangement, the operator can have direct control of the brake pedal 6 if it is desired to move the vehicle during the testing procedure.

The reference force initially applied by the operator's feet to the plate 41 is transmitted directly through the pressure transducer 48 to the brake pedal except for the small force required to overcome the minimum differential pressure on the piston 31, e.g. 3 psi. The transducer 48 generates a signal representative of this initial reference force and applies it to the computer control circuit 23. This signal may be used to operate a meter (not shown) or other indicating device to inform the computer and operator that the reference force exceeds the maximum anticipated pedal force.

In operation, the operator places his feet on the plate 41 and pushes downward until a minimum acceptable reference force is indicated by an appropriate meter (not shown) connected to computer control circuit 23. Such reference force is equal to the sum of the force transmitted to the brake pedal by the transducer 48 and the force on the lower side of the piston 31. When the brakes are released, the force on plate 41 is proportional to the pressure of the fluid on line 60. During the testing operation, the operator need only maintain this minimum reference force on the plate 41.

The magnitude of the force exerted on the brake pedal 6 is equal to the difference between the magnitude of the reference force (X direction component) and the magnitude of the force (X direction component) which is transferred or coupled from the contact pad 40 to the frame 4 by the fluid power cylinder 27. The fluid power cylinder 27 may be connected in an appropriate servo loop by the computer control circuit 23 as was discussed with regard to FIG. 1 to achieve a desired braking effort from the strongest brake or a desired brake pedal pressure.

A more complete description of a computer control system for use with the brake actuator disclosed herein is disclosed in the copending application Ser. No. 382,538, filed July 25, 1973, and assigned to the assignee of this application.

As disclosed in the FIGS. 1 and 7, the brake pedal actuator 2 utilizes a conventional cylinder and piston assembly to transfer a force from the frame to the brake pedal contact pad or vice versa. This assembly comprises basically a piston 30 with a circumferential seal or bearing 36 that slides back and forth inside the cylinder bore. Alternatively, a bellows type actuator may be used in place of the piston cylinder assembly 26. A wide variety of bellows type actuators is available in the prior art and are accordingly not disclosed in the present application.

Generally, the bellows-type actuator contemplated for use in the present invention comprises a flexible metal bellows which is housed inside a closed container. One end of the bellows is attached to and sealed by one end of the container with the other end of the bellows being relatively unrestrained inside the container and attached to the actuator rod. As the fluid pressure is introduced into the container and around the bellows, the bellows will shorten and displace the actuator rod. Another type of arrangement which can be considered for use in the present invention is a power assembly that utilizes a rolling diaphragm type seal in place of the conventional circumferential sliding seal. As the piston is displaced as a result of an increase in fluid pressure, the diaphragm will roll off the piston side wall onto the cylinder side wall. This provides a very low friction type of seal. A further variation of the rolling diaphragm type actuator which could be utilized in the present invention is a flexible diaphragm actuator. This actuator works on the same principle as the rolling diaphragm except that the diaphragm seal simply deflects with the actuator rod movement and does not roll along the piston and cylinder walls as the rolling diaphragm does. While the force produced in not linear with pressure, it could still be utilized in some systems compatible with the present invention.

In many applications of the brake pedal actuator 2 of the present invention it would be necessary to utilize an elaborate automatic control system or computer arrangement. For example, in an assembly line testing of installed brakes to be sure that the brakes operate, it would be necessary to perform tests that would indicate wear on the brake pads or scarring of the brake drums since it is known that only new equipment has been installed on the vehicles. Likewise, in a fleet test, certain variables can be eliminated and the necessary information as to the brake condition can be obtained by using the brake actuator of the present invention with a simplified control system or in conjunction with a dynamic brake analyzer as known in the prior art.

Referring now to FIG. 9, the actuator of FIG. 1 may be controlled by directly connecting the pneumatic line 66 to a fluid pressure source 90 via three branch lines 92, 94 and 96, respectively. In each branch line, there is a pressure regulator 98, 100 and 102 respectively, a solenoid operated valve 104, 106, and 108 respectively, and adjustable orifices 110, 112, and 114 respectively. When a solenoid valve 104 is energized or operated, the fluid pressure that is applied to the power cylinder assembly 26 is controlled by the regulator 98 to produce a brake pedal actuation of a force proportional to the setting of the pressure regulator. The adjustable orifice 110 is installed in series with the solenoid valve 104 and the pressure regulator 98 so that the rate of actuation of the brake pedal 6 may be controlled. The use of the multiple pressure lines 92, 94 and 96 will allow brake pedal actuations at different levels of force and rates of application.

A fourth solenoid valve 116 is mounted in exhaust line 118 along with an adjustable orifice 120. The fourth solenoid valve 116 permits the fluid pressure to be released when no brake actuation is desired. The adjustable orifice 120 controls the rate of pressure release. The solenoid valves 104, 106 and 108 can be controlled by switches (not shown) which are operated by a multicam timer (not shown) that permits the switches to be operated in a timed sequence of one at a time for a predetermined length of time.

Referring to FIG. 10, an alternative method of providing a simplified brake actuator control system is schematically disclosed. In this embodiment, a single pressure regulator 122 controls the application of fluid pressure to the fluid power cylinder 26 through a pressure line 126. An actuator rod 128 is controlled by a cam 130 that is driven by a geared motor (not shown).

In this embodiment, the pressure regulator 122 is controlled by the actuator rod 128 so that upon depression of the actuator rod 128, the output pressure of the regulator 122 is increased accordingly. The cam 130 is driven at an appropriate rate of rotation and has a profile that is designed to give the desired output pressure at the appropriate time which will result in a brake pedal actuation according to a predetermined testing procedure as is illustrated in FIG. 11. It should be noted that the rate of brake pedal force application and release can also be controlled by the proper design of the "ramps" on the cam surface.

Various modifications can be made by artisans of ordinary skill in the art to the present invention without departing from the spirit and scope of our invention. For example, different types of electric or hydraulic motor driven linkages may be utilized as the force transferring means 26 or 27. It is only necessary that the motor driven linkage be connected to move the contact pad 40 relative to the frame 4 in a direction to apply or remove pressure from the brake pedal in response to an appropriate control signal e.g. electric or hydraulic. A shaft or a pantograph mechanism may be used to push the contact pad and frame members apart (FIG. 1) or to pull the members together toward a common point (FIG. 7). In the embodiment of FIG. 7 the force transferring means may employ a flexible member such as a cable to pull the contact pad toward a point on the frame.

The contact pad and force transferring mechanism may be equipped with more or less sensing devices for indicating pedal pressure, pedal travel, etc., depending upon the particular parameters to be monitored. In the embodiment of FIG. 1, an approximate indication of brake pedal pressure may be obtained from the air pressure in line 60 or from the control signal applied to the transducer, thereby eliminating the need for the pressure transducer between the contact pad 40 and the brake pedal.

What is claimed is:

1. In an actuator mechanism for controlling the operation of a vehicle brake pedal mounted adjacent the floor board of a vehicle in response to a control signal, the brake pedal being arranged to apply the brakes of the vehicle when moved in a first direction, the combination which comprises:

a removable frame member adapted to be positioned on the floor board adjacent the brake pedal, the frame member including means for engaging only the floor board to prevent movement of the frame member in the first direction;

a pedal contact member adapted to engage the brake pedal;

force receiving means secured to one of the frame and pedal contact members for receiving a manual reference force having a component in a first direction when the actuator is positioned on the vehicle floor board;

force transferring means responsive to the control signal and connected between the frame and pedal contact members for providing a limited range of movement between the members along the first direction and for applying an equal and opposite force to the frame and pedal contact members, the force having a magnitude proportional to the control signal when the members are restrained from movement within said range.

2. The combination as defined in claim 1 wherein the force receiving means is secured to the frame member and wherein the force transferring means is arranged to exert a force on the pedal contact member in the first direction.

3. The combination as defined in claim 1 wherein the force receiving means is secured to the pedal contact member and wherein the force transferring means is arranged to exert a force on the pedal contact member in a direction opposite to the first direction.

4. The combination as defined in claim 1 including means for producing a first reference force signal in response to the application of a first predetermined reference force to the force receiving means.

5. The combination as defined in claim 4 including means for producing a second reference force signal in response to the application of a second predetermined force to the force receiving means.

6. The combination as defined in claim 1 including means for producing a pedal force signal representative of the force applied to the brake pedal.

7. The combination as defined in claim 6 wherein the means for producing the pedal force signal comprises a force responsive transducer connected to the pedal contact member and adapted to engage the brake pedal.

8. The combination as defined in claim 6 including a position sensing means for producing a pedal position signal representative of the position of the brake pedal contact member relative to the frame.

9. The combination as defined in claim 6 wherein the force transferring means includes a piston cylinder assembly, the piston being slidably positioned in the cylinder and being connected to the frame or pedal contact member, the cylinder being pivotally connected to the other member.

10. The combination as defined in claim 9 wherein the piston is connected to the pedal contact member.

11. The combination as defined in claim 9 including a source of pressurized fluid and fluid control means responsive to the control signal for controlling the application of the pressurized fluid to the piston cylinder assembly to provide a differential force on the piston which is proportional to the control signal.

12. The combination as defined in claim 11 wherein the fluid control means includes pedal contact sensing means carried by the contact member for producing a contact signal when the contact member engages the brake pedal and means responsive to the contact signal for applying pressurized fluid to the cylinder to provide a balanced force on the piston to thereby maintain the pedal contact member in engagement with the pedal.

13. The combination as defined in claim 6 including probe sensing means for producing an output signal when the distance between the pedal contact member and the floor board falls below the preselected minimum value.

14. In an actuator mechanism for controlling the operation of a vehicle brake pedal mounted adjacent the vehicle floor board, the brake pedal being arranged to apply the vehicle brakes by movement in a first direction toward the floor board, the combination which comprises:

a removable frame member adapted to be positioned on the floor board adjacent the brake pedal, the frame member including means for engaging only the floor board to prevent movement of the frame member in the first direction;

force receiving means carried by one of the frame and pedal contact members for receiving a manual reference force having a component in the first direction when the actuator is positioned on the vehicle floor board;

control signal generating means for producing a control signal; and force transferring means connected between the frame and pedal contact members for providing a limited range of movement between the members along the first direction and responsive to the control signal for exerting an equal and opposite force to the frame and pedal contact members, the force having a magnitude proportional to the value of the control signal when the members are restrained from movement within said range, to thereby transfer a portion of the component of the reference force receiving means to the other member in accordance with the value of the control signal.

15. The combination as defined in claim 14 wherein the control signal generating means includes means for obtaining a measure of the vehicle braking effort and for adjusting the value of the control signal in accordance with the braking effort.

16. The combination as defined in claim 14 including a pedal force control signal generating means for producing a pedal force signal representative of the force applied to the vehicle brake pedal by the actuator mechanism.

17. The combination as defined in claim 16 wherein the control signal generating means includes means responsive to the pedal force signal to adjust the control signal to provide a predetermined pedal force.

18. The combination as defined in claim 14 wherein the force receiving means is carried by the frame member.

19. The combination as defined in claim 18 wherein the force receiving means includes a foot treadle pivotally connected at one end to the frame and spring means connected between the other end of the treadle and the frame, the spring means being arranged to deflect in accordance with the magnitude of the reference force.

20. The combination as defined in claim 19 including reference force signal generating means connected between the frame member and the treadle for producing a reference force signal in response to the application of a predetermined reference force to the foot treadle.

21. The combination as defined in claim 20 including treadle force signal generating means for producing a treadle force signal representative of the magnitude of the reference force.

22. The combination as defined in claim 21 wherein the control signal generating means includes means responsive to the treadle force signal for providing a control signal which is proportional to the treadle force signal.

23. The combination as defined in claim 14 wherein the control signal generating means includes means for providing a control signal which varies in value in accordance with a predetermined time schedule.

24. The combination as defined in claim 14 wherein the force receiving means is carried by the pedal contact member and wherein the force transferring means urges the contact member in a direction opposite to the first direction in response to the control signal.

25. The combination as defined in claim 24 including pedal force signal generating means carried by the contact member for producing a pedal force signal representative of the force applied to the brake pedal by the contact member.

26. In an actuator for controlling the operation of a vehicle brake pedal mounted adjacent the floor board of a vehicle, the brake pedal being arranged to apply the vehicle brakes by movement in a first direction, the combination which comprises:
- a removable frame member adapted to be positioned on the floor board adjacent the brake pedal, the frame member including means for engaging only the floor board to prevent movement of the frame member in the first direction;
- a pedal contact member mounted on the frame for movement along the first direction when the actuator is positioned on the vehicle floor board, the contact member being adapted to engage the brake pedal;
- a force receiving support plate secured to the frame member for receiving a manual reference force in the first direction when the actuator is positioned on the vehicle floor board;
- means for producing a control signal; and
- force transferring means responsive to the control signal and coupled between the frame and pedal contact members for urging the contact member in the first direction with a force having a magnitude proportional to the value of the control signal to thereby apply a force to the brake pedal in accordance with the control signal when the manually applied reference force equals or exceeds the force on the contact member.

27. In an actuator for controlling the operation of a vehicle brake pedal mounted adjacent the floor board of a vehicle, the brake pedal being arranged to apply the vehicle brakes by movement in a first direction, the combination which comprises:
- a removable frame member adapted to be positioned on the floor board adjacent the brake pedal;
- a pedal contact member mounted on the frame for movement along the first direction when the actuator is positioned on the vehicle floor board, the contact member being adapted to engage the brake pedal;
- a force receiving support member secured to the pedal contact member for receiving a manual reference force in the first direction when the actuator is positioned on the vehicle floor board;
- means for producing a control signal; and
- force transferring means responsive to the control signal and coupled between the frame and pedal contact members for urging the contact member in a direction opposite to the first direction with a force having a magnitude proportional to the value of the control signal, to thereby apply a force to the brake pedal which is equal to the difference between the manually applied reference force in the first direction and the force exerted by the force transferring means.

28. In an actuator for controlling the operation of a vehicle brake control lever mounted adjacent a fixed member of a vehicle, the control lever being arranged to apply the vehicle brakes by movement in a first direction, the combination which comprises:
- a removable frame member adapted to be positioned on the fixed member adjacent the control lever, the frame member including means for engaging only the fixed member of the vehicle to prevent movement of the frame member in the first direction;
- a control lever contact member for movement along the first direction when the actuator is positioned on the vehicle fixed member, the contact member being adapted to engage the control lever;
- means carried by the frame member for receiving a manual force to urge the frame member against the vehicle fixed member to prevent relative movement therebetween;
- means for producing a control signal; and
- means responsive to the control signal and coupled between the frame and control lever contact members for urging the contact member in the first direction in accordance with the value of the control signal.

29. In an actuator for controlling the operation of a vehicle brake control lever mounted adjacent a fixed member of a vehicle, the control lever being arranged to apply the vehicle brakes by movement in a first direction, the combination which comprises:
- a removable frame member adapted to be positioned on the fixed member adjacent the control lever;
- a control lever contact member for movement along the first direction when the actuator is positioned on the vehicle fixed member, the contact member being adapted to engage the control lever;
- means carried by the control lever contact member for receiving a manual force to urge the control lever contact member against the control lever;
- means for producing a control signal; and
- means responsive to the control signal and coupled between the frame and control lever contact members for urging the contact member in a direction opposite to the first direction in accordance with the value of the control signal.

30. The method of controlling the operation of a vehicle brake control lever mounted adjacent a fixed member of a vehicle and being arranged to apply the vehicle brakes by movement in a first direction, with a brake actuator which includes a removable frame member adapted to be held against the fixed member, a control lever contact member for engaging the control lever, and a force transfer mechanism connected between the frame and the control lever contact members for exerting an equal and opposite force to the frame and lever contact members in accordance with the magnitude of a control signal comprising the steps of:
- positioning the frame member of the actuator on the vehicle fixed member so that the control lever contact member engages the brake control lever;
- applying a manual force of sufficient magnitude to the frame or control lever contact member to maintain the frame member against the fixed member while the vehicle brakes are being applied and released by the brake actuator; and
- applying a control signal to the force transfer mechanism to control the force applied to the brake control lever.

31. The method of claim 30 wherein the manual force is applied to the frame member.

32. The method of claim 30 wherein the manual force is applied to the lever contact member.

* * * * *

UNITED STATES PATENT AND TRADEMARK OFFICE
CERTIFICATE OF CORRECTION

PATENT NO. : 3,877,299
DATED : April 15, 1975
INVENTOR(S) : William Clayton, Sr. and Edwin Lee Cline It is certified that error appears in the above—identified patent and that said Letters Patent are hereby corrected as shown below:

Column 5, Line 16 - change "realtionship" to --- relationship ----;

Line 45 - change "assenbly" to --- assembly ----.

Column 9, Line 20 - change "would be" to --- would not be ----;

Line 24 - change "would be" to --- would not be ----.

Column 11, Claim 13, Line 57 - change "the preselected" to

--- a preselected ----.

Signed and Sealed this ninth Day of December 1975

[SEAL]

Attest:

RUTH C. MASON
Attesting Officer

C. MARSHALL DANN
Commissioner of Patents and Trademarks